United States Patent
Lee et al.

(10) Patent No.: US 11,553,146 B2
(45) Date of Patent: Jan. 10, 2023

(54) IMAGE SIGNAL PROCESSOR AND IMAGE PROCESSING SYSTEM

(71) Applicant: SK hynix Inc., Gyeonggi-do (KR)

(72) Inventors: Yoon Gyoo Lee, Gyeonggi-do (KR); Seong Hee Park, Gyeonggi-do (KR); Ji Soo Son, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 78 days.

(21) Appl. No.: 17/332,164

(22) Filed: May 27, 2021

(65) Prior Publication Data

US 2022/0182564 A1   Jun. 9, 2022

(30) Foreign Application Priority Data

Dec. 9, 2020   (KR) .................... 10-2020-0171106

(51) Int. Cl.
*H04N 5/357* (2011.01)
*H04N 9/04* (2006.01)
*H04N 7/01* (2006.01)
*G06K 7/14* (2006.01)
*G06T 5/00* (2006.01)
*H04N 9/73* (2006.01)

(52) U.S. Cl.
CPC ........... *H04N 5/357* (2013.01); *H04N 9/0455* (2018.08)

(58) Field of Classification Search
CPC .... H04N 5/357; H04N 7/0135; H04N 9/0455; H04N 9/04557; H04N 9/04559; H04N 9/735; G06K 7/1469; G06T 5/003; G06T 2207/10024; G06T 2207/20024
See application file for complete search history.

(56) References Cited

U.S. PATENT DOCUMENTS

| | | | |
|---|---|---|---|
| 10,402,689 B1 | 9/2019 | Bogdanovych et al. | |
| 11,350,048 B1* | 5/2022 | Magnani | H04N 5/351 |
| 11,412,164 B1* | 8/2022 | Abreu | H04N 5/361 |
| 2014/0253808 A1* | 9/2014 | Tachi | H04N 9/04557 |
| | | | 348/624 |
| 2014/0307135 A1* | 10/2014 | Tanaka | H04N 9/646 |
| | | | 348/280 |
| 2017/0278224 A1* | 9/2017 | Onzon | G06T 5/002 |
| 2018/0192011 A1* | 7/2018 | Mlinar | G06T 5/10 |
| 2019/0222812 A1* | 7/2019 | Cha | H04N 9/04515 |
| 2019/0378246 A1* | 12/2019 | Prentice | G06T 5/002 |
| 2022/0014684 A1* | 1/2022 | Zhou | H04N 5/23222 |

FOREIGN PATENT DOCUMENTS

KR   10-2016-0074337   6/2016

OTHER PUBLICATIONS

He et al., Guided Image Filtering, IEEE Transactions on Pattern Analysis and Machine Intelligence, 2013, p. 1-p. 13, IEEE Computer Society.

* cited by examiner

*Primary Examiner* — Marly S Camargo
(74) *Attorney, Agent, or Firm* — IP & T Group LLP

(57) ABSTRACT

An image processing system includes: an image sensor suitable for generating an RYYB (Red Yellow Yellow Blue) bayer image by applying an RYYB color filter array; an interpolation logic suitable for generating a Y image at a position of an R image portion in the RYYB bayer image by interpolating a YY image portion in the RYYB bayer image; and a guided filtering logic suitable for guided-filtering the R image portion in the RYYB bayer image by using, as a guide image, the Y image at the position of the R image portion.

18 Claims, 3 Drawing Sheets

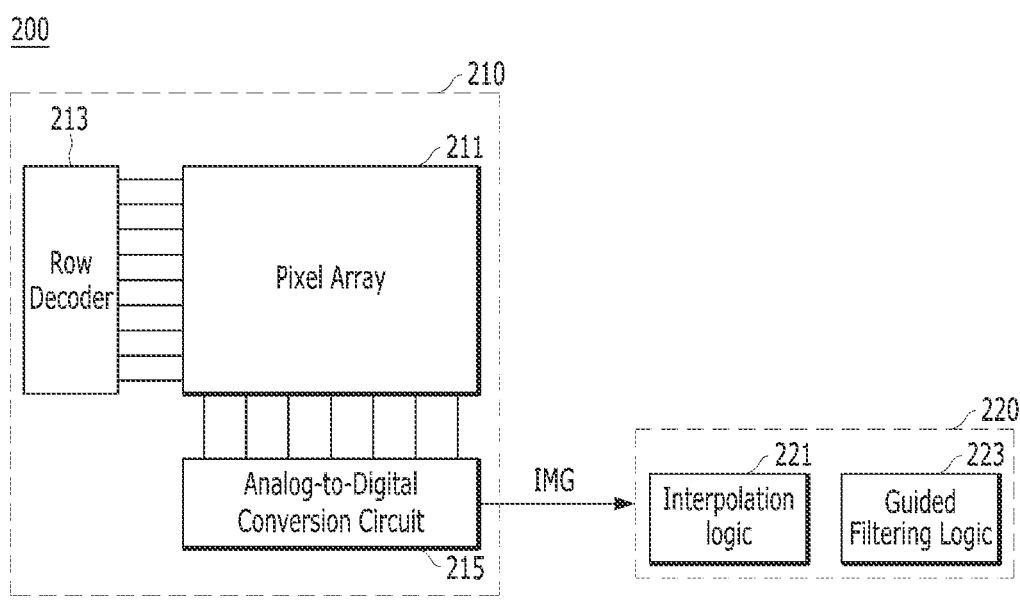

IMAGE SIGNAL PROCESSOR AND IMAGE PROCESSING SYSTEM

CROSS-REFERENCE TO RELATED APPLICATIONS

The present application claims priority to Korean Patent Application No. 10-2020-0171106, filed on Dec. 9, 2020, which is incorporated herein by reference in its entirety.

BACKGROUND

1. Field

Various embodiments of the present invention relate to an image processing system.

2. Description of the Related Art

An image sensor is a device that captures an image by using the property of a semiconductor that responds to light. Recently, with the development of the computer industry and the communication industry, demand for image sensors with improved performance in various fields such as smart phones, digital cameras, game devices, Internet of Things, robots, security cameras, and medical microcameras has been increasing.

Image sensors may be largely divided into a Charge Coupled Device (CCD) image sensor and a Complementary Metal Oxide Semiconductor (CMOS) image sensor. The CCD image sensor has less noise and superior image quality compared to the CMOS image sensor. However, the CMOS image sensor has a simple driving method and may be implemented in various scanning methods. Also, since the CMOS image sensor can integrate a signal processing circuit onto a single chip, products may be easily miniaturized with low power consumption, and CMOS process technology may be used interchangeably, resulting in low manufacturing cost. Recently, CMOS image sensing devices are being widely used due to their characteristics which are more appropriate for mobile devices.

SUMMARY

Embodiments of the present invention are directed to reducing noise of an image generated by an image sensor.

In accordance with an embodiment of the present invention, an image processing system includes: an image sensor suitable for generating an RYYB (Red Yellow Yellow Blue) bayer image by applying an RYYB color filter array; an interpolation logic suitable for generating a Y image at a position of an R image portion in the RYYB bayer image by interpolating a YY image portion in the RYYB bayer image; and a guided filtering logic suitable for guided-filtering the R image portion in the RYYB bayer image by using, as a guide image, the Y image at the position of the R image portion.

In accordance with another embodiment of the present invention, an image processing system includes: an image sensor suitable for generating an RWWB (Red White White Blue) bayer image by applying an RWWB color filter array; an interpolation logic suitable for generating a W image at a position of an R image portion in the RWWB bayer image by interpolating a WW image portion of the RWWB bayer image, and generating a W image at a position of a B image portion in the RWWB bayer image by interpolating the WW image portion of the RWWB bayer image; and a guided filtering logic suitable for guided-filtering the R image portion in the RWWB bayer image by using, as a guide image, the W image at the position of the R image portion, and guided-filtering the B image portion in the RWWB bayer image by using, as a guide image, the W image at the position of the B image portion.

In accordance with yet another embodiment of the present invention, an image signal processor receiving and processing an RYYB (Red Yellow Yellow Blue) bayer image from an image sensor includes: an interpolation logic suitable for generating a Y image at a position of an R image portion in the RYYB bayer image by interpolating a YY image portion in the RYYB bayer image; and a guided filtering logic suitable for guided-filtering the R image portion in the RYYB bayer image by using, as a guide image, the Y image at the position of the R image portion.

In accordance with still another embodiment of the present invention, an image signal processor receiving and processing an RWWB (Red White White Blue) bayer image from an image sensor includes: an interpolation logic suitable for generating a W image at a position of an R image portion in the RWWB bayer image by interpolating a WW image portion in the RWWB bayer image, and generating a W image at a position of a B image portion in the RWWB bayer image by interpolating the WW image portion in the RWWB bayer image; and a guided filtering logic suitable for guided-filtering the R image portion in the RWWB bayer image by using, as a guide image, the W image at the position of the R image portion, and guided-filtering the B image portion in the RWWB bayer image by using, as a guide image, the W image at the position of the B image portion.

In accordance with still another embodiment of the present invention, an image processing system includes: an image sensor suitable for generating a bayer image by applying a color filter array including a plurality of colors including at least a first color and a second color; an interpolation logic suitable for generating a first color image at a position of a second color image portion in the bayer image by interpolating a first color image portion in the bayer image; and a guided filtering logic suitable for guided-filtering the second color image portion in the bayer image by using, as a guide image, the first color image at the position of the second color image portion.

In accordance with still another embodiment of the present invention, an image processing system includes: an image sensor suitable for generating a bayer image by applying a color filter array that includes a plurality of colors including at least a first color and a second color; and an interpolation logic suitable for generating a first color image at a position of a second color image portion in the bayer image by interpolating a first color image portion in the bayer image.

In accordance with still another embodiment of the present invention, an operating method of an image signal processor includes: interpolating a first color image portion of a bayer image, which has a repetitive pattern of at least first and second colors thereby having the first color image portion configured by the first colors and a second color image portion configured by the second colors, to generate an interpolated image portion having the first colors disposed at positions of the second colors; guided-filtering the second image portion by utilizing the interpolated image portion as a guide image to generate a guided-filtered image portion; and generating a filtered bayer image based on the first color image portion and the guided-filtered image portion.

BRIEF DESCRIPTION OF THE DRAWINGS

FIG. 1A illustrates an RGGB (Red Green Green Blue) color filter array.

FIG. 1B illustrates a RYYB (Red Yellow Yellow Blue) color filter array.

FIG. 2 is a block diagram illustrating an image processing system 200 in accordance with an embodiment of the present invention.

DETAILED DESCRIPTION

Figure 3:
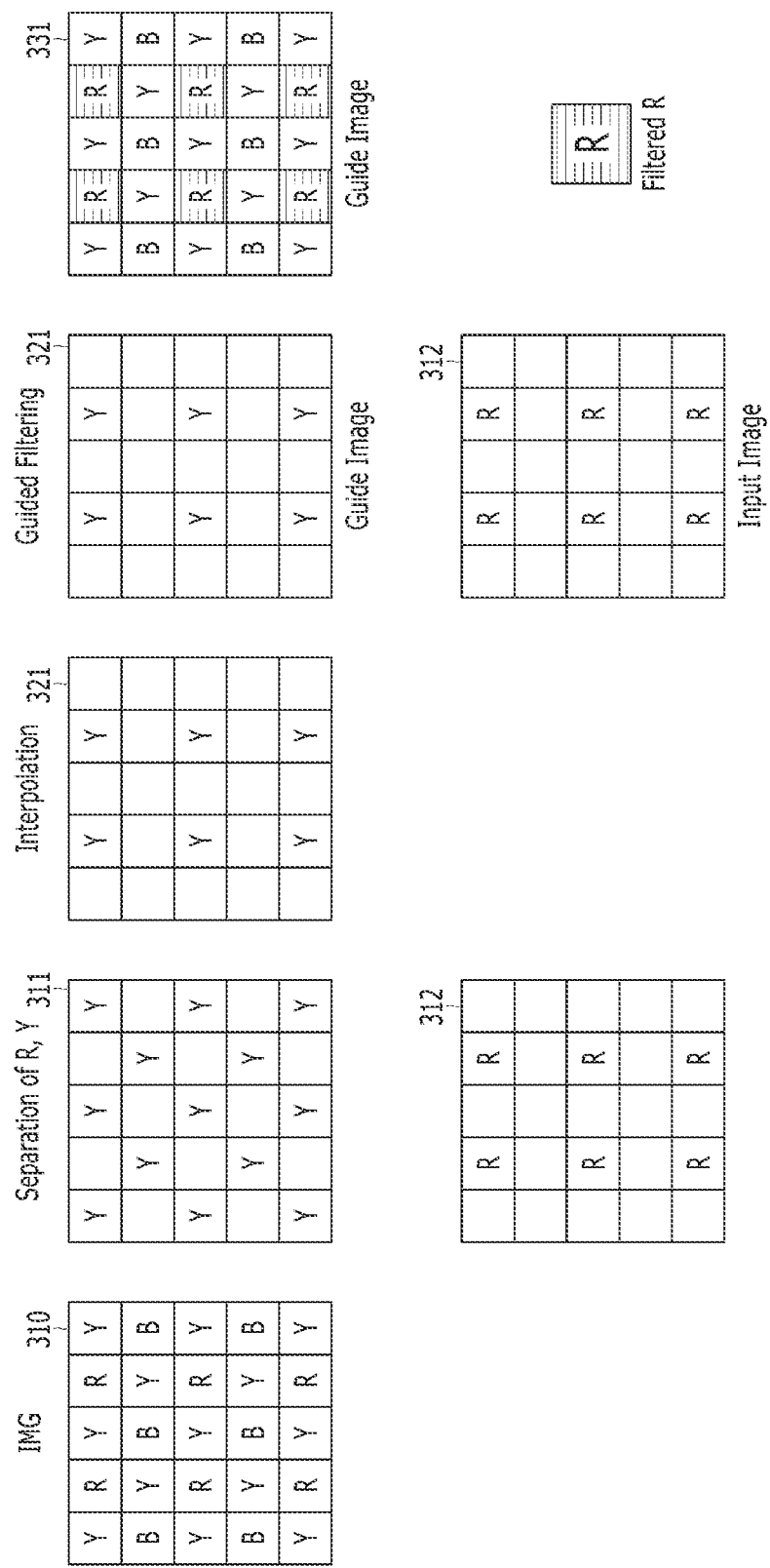
FIG. 3 illustrates the operation of an image signal processor 220 when an image IMG generated by an image sensor 210 is an RYYB bayer image in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1A illustrates an RGGB (Red Green Green Blue) color filter array. It is a color filter array most commonly used in the pixel arrays of image sensors, and it has a pattern in which a square formed of one R pixel, two G pixels, and one B pixel are arranged is repeated. FIG. 1B shows an RYYB (Red Yellow Yellow Blue) color filter array. The RYYB color filter array is a color filter array in which G is replaced by Y in the RGGB color filter array because Y has a higher signal-to-noise ratio (SNR) than G. Y contains both R and G components, and the G component may be obtained through an algorithm that excludes the R component from Y. Moreover, another color filter array is called an RWWB (Red White White Blue) color filter array. The RWWB color filter array is a color filter array in which G is replaced by W in the RGGB color filter array, because W has a higher signal-to-noise ratio than G. W includes all of the R, G, and B components, and the G component may be obtained through an algorithm that excludes the G and B components from W.

FIG. 2 is a block diagram illustrating an image processing system 200 in accordance with an embodiment of the present invention.

Referring to FIG. 2, the image processing system 200 may include an image sensor 210 and an image signal processor 220.

The image sensor 210 may generate a bayer image by applying a color filter array. The image sensor 210 may apply one of the color filter arrays from the RYYB color filter array and the RWWB color filter array. When the image sensor 210 uses an RYYB color filter array, the image output from the image sensor 210 may be an RYYB bayer image, and when the image sensor 210 uses an RWWB color filter array, the image output from the image sensor 210 may be an RWWB bayer image.

The image sensor 210 may include a pixel array 211, a row decoder 213, and an analog-to-digital conversion circuit 215.

The pixel array 211 may include a plurality of pixels that are arranged in an array including a plurality of rows and a plurality of columns. The pixels may output a pixel signal out of sensed light. One of the color filter arrays from an RYYB color filter array and an RWWB color filter array may be applied to the pixel array 211.

The row decoder 213 may control an operation by selecting pixels of the pixel array 211 for each row. Under the control of the row decoder 213, pixels of one row at a time may output pixel signals to the analog-to-digital conversion circuit 215.

The analog-to-digital conversion circuit 215 may perform analog-to-digital conversion of pixel signals that are output from the pixel array. The result of converting the pixel signals to digital signals may be output as an image IMG. When an RYYB color filter array is applied to the pixel array 211, the image IMG may be an RYYB bayer image, and when an RWWB color filter array is applied to the pixel array 211, the image IMG may be an RWWB bayer image.

The image signal processor 220 may perform an operation to increase the quality of an image generated by the image sensor 210. The image signal processor 220 may include an interpolation logic 221 and a guided filtering logic 223. The interpolation logic 221 may generate a guide image to be used for guided filtering through an interpolation operation. The guided filtering logic 223 may be a kind of well-known edge-preserving smoothing filtering and may be a filter that improves image quality by using a guide image having less noise. The operation of the interpolation logic 221 and the guided filtering logic 223 will be described in detail below with reference to FIGS. 3 and 4.

Although FIG. 2 illustrates that the image signal processor 220 includes the interpolation logic 221 and the guided filtering logic 223, which are related components for guided filtering, it is apparent to those skilled in the art to which the present invention pertains that diverse logics for performing diverse operations to improve image quality may be further included in the image processor.

FIG. 3 illustrates the operation of the image signal processor 220 when an image IMG generated by an image sensor 210 is an RYYB Bayer image in accordance with an embodiment of the present invention.

In FIG. 3, '310' may represent an RYYB bayer image that is generated by the image sensor 210 and transferred to the image signal processor 220. When the YY image portion is separated from the RYYB bayer image 310, the result may become '311', and when the R image part is separated from the RYYB bayer image 310, the result may become '312'.

The interpolation logic 221 may interpolate the YY image portion 311 of the RYYB bayer image 310 to generate a Y image 321 corresponding to the position of the R image portion 312 of the RYYB bayer image 310.

The Y image 321 generated by the interpolation logic 221 may have the same position information as that of the R image portion 312, and since it is generated based on the YY image portion 311 having a high signal-to-noise ratio, it may have a high signal-to-noise ratio. Also, Y contains an R component. As a result, the Y image 321 generated by the interpolation logic 221 may be an image containing an R component at the same position as that of the R image position 312 and having a high signal-to-noise ratio.

The guided filtering logic 223 may guided-filter the R image 312 by using the Y image 321 as a guide image. '331' may represent a filtered R image.

Now the R image portion 312 in the RYYB bayer image 310 may be replaced with the filtered R image, and as a result, the filtered RYYB bayer image 331 may be generated.

Figure 4:
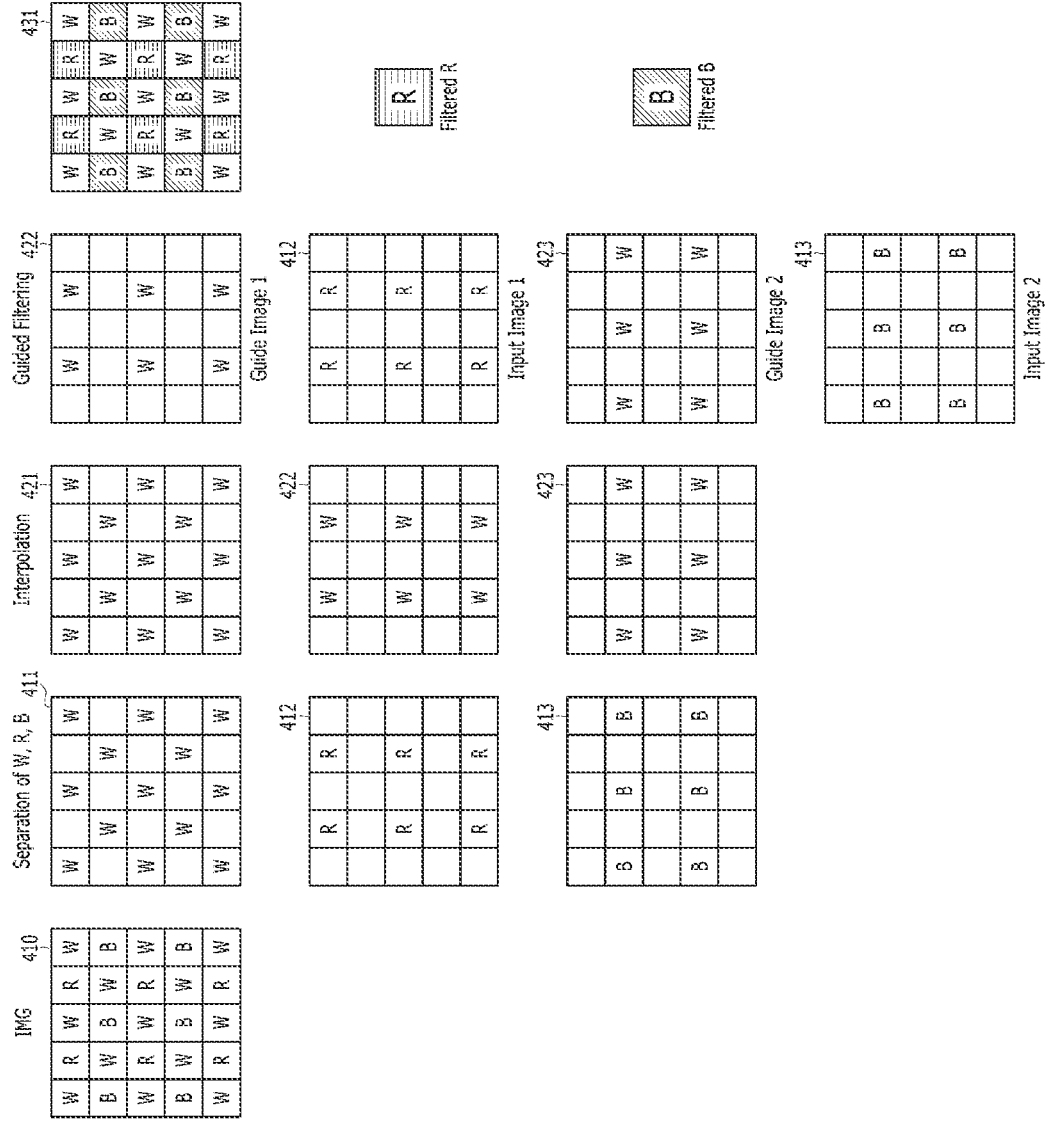
FIG. 4 illustrates the operation of the image signal processor 220 when the image IMG generated by the image sensor 210 is an RWWB (Red White White Blue) bayer image in accordance with an embodiment of the present invention.

FIG. 4 illustrates the operation of the image signal processor 220 when the image IMG generated by the image sensor 210 is an RWWB bayer image in accordance with an embodiment of the present invention.

In FIG. 4, '410' may represent an RWWB bayer image that is generated by the image sensor 210 and transferred to the image signal processor 220. When the WW image position is separated from the RWWB bayer image 410, it may become '411', and when the R position is separated from the RWWB bayer image 410, it may become '412', and when the position B is separated from the RWWB bayer image 410, it may become '413'.

The interpolation logic 221 may interpolate a WW image portion 411 of the RWWB bayer image 410 to generate a W image 421 which corresponds to the position of the R image portion 412 and the position of the B image portion 413 in the RWWB bayer image 410. The W image 421 may be divided into a W image 422 corresponding to the R image portion 412 and a W image 423 corresponding to the B image portion 413.

The guided filtering logic 223 may generate a filtered R image by using the W image 422 as a guide image and guided-filtering the R image 412. Also, the guided filtering logic 223 may generate the filtered B image by using the W image 423 as a guide image and guided-filtering the B image 413.

Now the R image portion 412 in the RWWB bayer image 410 may be replaced with the filtered R image, and the B image portion 413 in the RWWB bayer image 410 may be replaced with the filtered B image. As a result, a filtered RWWB bayer image 431 may be generated.

In the above embodiments of the present invention, a guide image may be generated by using interpolation on the RYYB bayer image and the RWWB bayer image, and the image quality may be increased by applying guided filtering using the generated guide image. However, the present invention may also be applied to a bayer image of another color arrangement which is not RYYB or RWWB. For example, a first color image at a second color position may be generated by interpolating a first color position from the bayer image, and a second color image may be guided-filtered by using the first color image generated by the interpolation as a guide image.

Also, in the above embodiments of the present invention, a guide image may be generated and the generated guide image may be used for guided filtering, but the generated guide image may be used for processing other than filtering.

According to the embodiment of the present invention, noise of an image generated by an image sensor may be reduced.

While the present invention has been described with respect to the specific embodiments, it will be apparent to those skilled in the art that various changes and modifications may be made without departing from the spirit and scope of the invention as defined in the following claims.

What is claimed is:

1. An image processing system, comprising:
an image sensor suitable for generating an RYYB (Red Yellow Yellow Blue) bayer image by applying an RYYB color filter array;
an interpolation logic suitable for generating a Y image at a position of an R image portion in the RYYB bayer image by interpolating a YY image portion in the RYYB bayer image; and
a guided filtering logic suitable for guided-filtering the R image portion in the RYYB bayer image by using, as a guide image, the Y image at the position of the R image portion.

2. The image processing system of claim 1, wherein the R image portion in the RYYB bayer image is replaced with an R image that is guided-filtered by the guided filtering logic.

3. The image processing system of claim 1, wherein the image sensor includes:
a pixel array including a plurality of pixels to which the RYYB color filter array is applied; and
an analog-to-digital conversion circuit suitable for generating the RYYB bayer image by performing analog-to-digital conversion on the pixel signals output from the pixel array.

4. An image processing system, comprising:
an image sensor suitable for generating an RWWB (Red White White Blue) bayer image by applying an RWWB color filter array;
an interpolation logic suitable for generating a W image at a position of an R image portion in the RWWB bayer image by interpolating a WW image portion of the RWWB bayer image, and generating a W image at a position of a B image portion in the RWWB bayer image by interpolating the WW image portion of the RWWB bayer image; and
a guided filtering logic suitable for guided-filtering the R image portion in the RWWB bayer image by using, as a guide image, the W image at the position of the R image portion, and guided-filtering the B image portion in the RWWB bayer image by using, as a guide image, the W image at the position of the B image portion.

5. The image processing system of claim 4, wherein the R image portion and the B image portion in the RWWB bayer image are replaced respectively with an R image which is guided-filtered by the guided-filtering logic and a B image which is guided-filtered by the guided filtering logic.

6. The image processing system of claim 4, wherein the image sensor includes:
a pixel array including a plurality of pixels to which the RWWB color filter array is applied; and
an analog-to-digital conversion circuit suitable for generating the RWWB bayer image by performing analog-to-digital conversion on the pixel signals output from the pixel array.

7. An image signal processor receiving and processing an RYYB (Red Yellow Yellow Blue) bayer image from an image sensor, comprising:
an interpolation logic suitable for generating a Y image at a position of an R image portion in the RYYB bayer image by interpolating a YY image portion in the RYYB bayer image; and
a guided filtering logic suitable for guided-filtering the R image portion in the RYYB bayer image by using, as a guide image, the Y image at the position of the R image portion.

8. The image signal processor of claim 7, wherein the R image portion in the RYYB bayer image is replaced with an R image that is guided-filtered by the guided filtering logic.

9. An image signal processor receiving and processing an RWWB (Red White White Blue) bayer image from an image sensor, comprising:

an interpolation logic suitable for generating a W image at a position of an R image portion in the RWWB bayer image by interpolating a WW image portion in the RWWB bayer image, and generating a W image at a position of a B image portion in the RWWB bayer image by interpolating the WW image portion in the RWWB bayer image; and a guided filtering logic suitable for guided-filtering the R image portion in the RWWB bayer image by using, as a guide image, the W image at the position of the R image portion, and guided-filtering the B image portion in the RWWB bayer image by using, as a guide image, the W image at the position of the B image portion.

10. The image signal processor of claim 9, wherein the R image portion and the B image portion in the RWWB bayer image are replaced respectively with an R image which is guided-filtered by the guided-filtering logic and a B image which is guided-filtered by the guided filtering logic.

11. An image processing system, comprising:

an image sensor suitable for generating a bayer image by applying a color filter array including a plurality of colors including at least a first color and a second color;

an interpolation logic suitable for generating a first color image at a position of a second color image portion in the bayer image by interpolating a first color image portion in the bayer image; and a guided filtering logic suitable for guided-filtering the second color image portion in the bayer image by using, as a guide image, the first color image at the position of the second color image portion.

12. The image processing system of claim 11, wherein the first color image portion in the bayer image has a higher signal-to-noise ratio than the second color image portion in the bayer image.

13. The image processing system of claim 12, wherein the second color image portion in the bayer image is replaced with a second color image that is guided-filtered by the guided filtering logic.

14. An image processing system, comprising:

an image sensor suitable for generating a bayer image by applying a color filter array that includes a plurality of colors including at least a first color and a second color; and an interpolation logic suitable for generating a first color image at a position of a second color image portion in the bayer image by interpolating a first color image portion in the bayer image.

15. The image processing system of claim 14, wherein the first color image at the position of the second color image portion which is generated by the interpolation logic is used as a guide image for the second color image portion in the bayer image.

16. The image processing system of claim 14, wherein the first color is Y (yellow), and the second color is R (red).

17. The image processing system of claim 14, wherein the first color is W (white), and the second color is R (red).

18. The image processing system of claim 14, wherein the first color is W (white), and the second color is B (blue).

* * * * *